United States Patent [19]
Dax

[11] Patent Number: 5,277,289
[45] Date of Patent: Jan. 11, 1994

[54] FLUID FRICTION COUPLING

[75] Inventor: Harald Dax, Stuttgart, Fed. Rep. of Germany

[73] Assignee: Behr GmbH & Co., Stuttgart, Fed. Rep. of Germany

[21] Appl. No.: 993,061

[22] Filed: Dec. 18, 1992

[30] Foreign Application Priority Data

Dec. 19, 1991 [DE] Fed. Rep. of Germany ....... 4142013

[51] Int. Cl.$^5$ .............................................. F16D 31/00
[52] U.S. Cl. .................. 192/58 B; 192/58 R; 403/285; 411/309
[58] Field of Search .................. 192/58; 403/282, 285; 411/308, 309, 937.1

[56] References Cited

U.S. PATENT DOCUMENTS

| | | | |
|---|---|---|---|
| 3,174,600 | 3/1965 | Oldberg | 192/58 B |
| 3,323,623 | 6/1967 | Roper | 192/58 B |
| 3,351,115 | 11/1967 | Boehlow | 411/308 |
| 4,728,216 | 3/1988 | Disborg | 403/282 |
| 4,741,091 | 5/1988 | Settles | 403/282 X |
| 4,943,178 | 7/1990 | Weinstein | 403/282 X |
| 5,158,390 | 10/1992 | Ito et al. | 403/282 |

FOREIGN PATENT DOCUMENTS 0269835  9/1991  European Pat. Off.

Primary Examiner—Rodney H. Bonck
Assistant Examiner—Andrea Pitts
Attorney, Agent, or Firm—Walter Ottesen

[57] ABSTRACT

The invention is directed to a fluid friction coupling which includes a drive shaft made of steel and a drive disc made of an aluminum alloy. A coupling housing defines a work space in which the drive disc is disposed. The drive disc includes a hub defining an internal thread and the drive shaft has an end lug defining an outer thread. The drive shaft and hub are threadably engaged and tightened with respect to each other so as to cause the threads to conjointly define a thread joint which is plastically deformed to provide a permanent joint between the drive disc and the drive shaft.

6 Claims, 1 Drawing Sheet

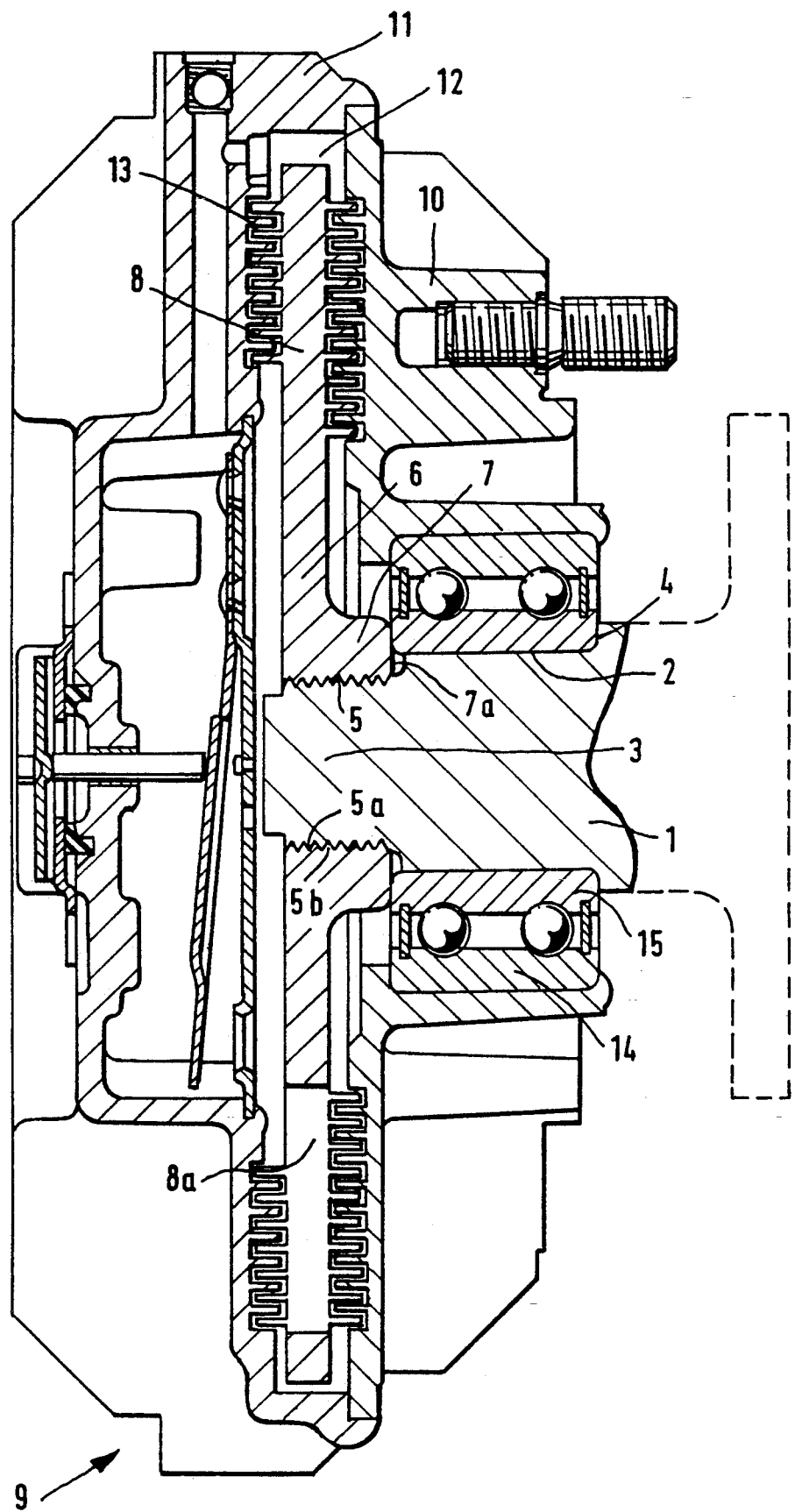

FLUID FRICTION COUPLING

BACKGROUND OF THE INVENTION

European patent publication 0,269,835 discloses a fluid friction coupling wherein the hub of the drive disc is made of aluminum and the flanged shaft is made of steel. A cut-tooth system is provided between the hub with the flanged shaft having an inner serration and the hub of the drive disc having an outer serration. The serrations are produced by metal cutting during the assembly. This shaft-hub connection is technically quite adequate but the production of the cut-tooth system is relatively complex and the reproducible accuracy is difficult to control.

SUMMARY OF THE INVENTION

In view of the above, it is an object of the invention to provide a fluid friction coupling wherein a connection is provided between the shaft and hub of the drive disc which connection is free of defects and takes into account the different expansion coefficients of steel and aluminum. It is another object of the invention to provide such a fluid friction coupling which is especially economical to manufacture.

The fluid friction coupling of the invention includes: a drive shaft made of steel and having an output lug defining a first thread; a coupling housing defining a work chamber; a drive disc disposed in the work chamber and being made of an aluminum alloy; roller bearing means for rotatably journalling the coupling housing relative to the drive shaft; the drive disc and the coupling housing conjointly defining gap means in the work chamber for receiving a viscous medium therein to facilitate a transfer of torque between the drive disc and the coupling housing; the drive disc having a hub defining a second thread for receiving and threadably engaging the first thread; and, the hub and the lug of the drive shaft being tightened with respect to each other so as to cause the threads to conjointly define a threaded joint plastically deformed to provide a permanent joint between the drive disc and the drive shaft.

According to a feature of the invention, the shaft-hub connection is configured as a threaded connection, that is, the drive disc simply threadably engages the flanged shaft. The threads are already formed into the parts to be connected, that is, the lug of the flanged shaft has an outer thread and the hub of the drive disc has an internal thread. The different expansions of the shaft and hub caused by temperature are surprisingly very well compensated by the thread which, at the same time, also assumes the centering task.

According to another feature of the invention, the threaded pair is configured as a fine thread and, in this way, an especially good rotational accuracy or centering between the flanged shaft and the drive disc is obtained on the one hand and, on the other hand, the fine thread makes it possible to generate a relatively high contact force between the hub and the support surface thereof for a pregiven tightening torque.

The end face of the hub of the drive disc is braced in an advantageous manner with respect to the inner race of the bearing whereby the race is axially fixed relative to the flanged shaft. This thread connection does not require any additional locking means against loosening; rather, the drive disc is simply locked tight -- the drive shaft by means of a defined tightening torque; that is, the drive shaft is tightened against the inner race of the bearing and against a corresponding shoulder of the flanged shaft. A plastic permanent deformation takes place within the threaded connection.

In addition, the pitch direction of the winding should correspond to the rotational direction of the flanged shaft when viewed in the direction of rotation; that is, for a flanged shaft rotating in the clockwise direction, a clockwise thread is to be provided. In this way, a loosening of the threaded connection is likewise countered because the flanged shaft or its threaded lug always works its way into the thread of the drive disc.

BRIEF DESCRIPTION OF THE DRAWING

The invention will now be described with reference to the drawing which is a single figure and shows a fluid friction coupling according to the invention.

DESCRIPTION OF THE PREFERRED EMBODIMENTS OF THE INVENTION

The fluid friction coupling shown in the drawing includes a flanged shaft 1 for driving the coupling and a coupling housing 9 which defines the output end on which preferably a fan for the radiator of an internal combustion engine can be attached. The flanged shaft 1 is connected directly to the crankshaft of the internal combustion engine (not shown). It is however also possible that the flanged shaft 1 is configured without a flange in the manner of a drive shaft journalled in the water pump housing.

This flanged shaft 1 includes a bearing seat 2 on which a roller bearing 14 is pushed with its inner race 15 and is braced against a shoulder 4 on the flanged shaft. The roller bearing 15 is here a twin-groove ball bearing and supports a base body 10 on its outer race with the base body being connected to a cover 11. The base body 10 and the cover 11 conjointly define the coupling housing 9.

The coupling housing 9 includes a work chamber 12 wherein a drive disc 6 rotates and which, in turn, is connected to the flanged shaft 1. The drive disc 6 and the coupling housing 9 conjointly define the gap 13 at the outer region 8 of the drive disc. The gap 13 is filled with a viscous medium for transmitting torque. The further configuration of this coupling is known per se and is therefore not further described herein.

According to the invention, the connection between the flanged shaft 1 and the drive disc 6 is configured as thread means 5. The flanged shaft 1 is stepped with respect to the bearing seat 2 and defines a threaded lug 3 having an outer thread 5a. In a corresponding manner, the drive disc 6 includes a hub 7 provided with an internal thread 5b which threadably engages the outer thread 5a. The end face 7a of the hub 7 comes into contact engagement with the inner race 15 which is braced, on the other hand, with respect to the shoulder 4 of the flanged shaft 1.

The drive disc 6 is tightened with a specific tightening torque for the purpose of final assembly. A corresponding tool engages slits 8a distributed about the periphery. The thread means 5 is preferably configured as a fine thread, for example, M 20 ×1 whereby an especially high axial force results when the drive disc 6 is tightened. When the drive disc is tightened, a plastic deformation of the connection 5 is deliberately permitted to take place within certain limits so that a locking of the drive disc 6 against loosening is achieved. Further locking means are then not required and an exceptionally simple and rapid assembly results.

In addition, the threads 5a and 5b are economical to produce in both parts such as on automatic machines. It has been surprisingly shown that an adequate centering of the drive disc 6 with respect to the flanged shaft 1 is obtained simply by means of this threaded connection. In this context, it should be noted that the machining of the drive disc and especially the gap geometry 13 already takes place in advance of threadably engaging the threads.

The finished machined drive disc 6 is threadably engaged and locked by means of a tightening torque after the bearing 14 with the base body 10 is pushed onto the bearing seat 2 of the flanged shaft 1. Thereafter, the cover 11 is seated on the base body 10 and rolled thereon. The assembly of the fluid friction coupling is then completed.

It is understood that the foregoing description is that of the preferred embodiments of the invention and that various changes and modifications may be made thereto without departing from the spirit and scope of the invention as defined in the appended claims.

What is claimed is:

1. A fluid friction coupling comprising:
   a drive shaft made of steel and having an output lug defining a first thread;
   a coupling housing defining a work chamber;
   a drive disc disposed in said work chamber and being made of an aluminum alloy;
   roller bearing means for rotatably journalling said coupling housing relative to said drive shaft;
   said drive disc and said coupling housing conjointly defining gap means in said work chamber for receiving a viscous medium therein to facilitate a transfer of torque between said drive disc and said coupling housing;
   said drive disc having a hub defining a second thread for receiving and threadably engaging said first thread; and,
   said hub and said lug of said drive shaft being tightened with respect to each other so as to cause said threads to conjointly define a threaded joint plastically deformed to provide a permanent joint between said drive disc and said drive shaft.

2. The fluid friction coupling of claim 1, said first and second threads being fine threads corresponding approximately to an M 20×1 thread.

3. The fluid friction coupling of claim 1, said roller bearing means being a roller bearing having inner and outer races; said shaft having a bearing seat formed thereon next to said lug for receiving said roller bearing thereon; said lug of said shaft having a diameter less than said bearing seat; said inner race being in contact engagement with said bearing seat; and, said hub of said drive disc being pressed against said inner race.

4. The fluid friction coupling of claim 1, wherein said threaded joint is locked against loosening exclusively by a defined torque applied to said drive disc relative to said drive shaft.

5. The fluid friction coupling of claim 1, said first and second threads defining a pitch which corresponds to the direction of rotation of said drive shaft.

6. The fluid friction coupling of claim 1, said drive shaft having an end portion lying opposite to said lug and having a flange formed on said end portion for connecting said flange to a motor.

* * * * *